United States Patent
Tomita (10) Patent No.: US 10,513,960 B2
(45) Date of Patent: Dec. 24, 2019

(54) EXHAUST PURIFICATION DEVICE FOR ENGINE

(71) Applicant: VOLVO TRUCK CORPORATION, Göteborg (SE)

(72) Inventor: Yasutoshi Tomita, Saitama (JP)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 15/536,724

(22) PCT Filed: Dec. 25, 2014

(86) PCT No.: PCT/JP2014/084381
§ 371 (c)(1),
(2) Date: Jun. 16, 2017

(87) PCT Pub. No.: WO2016/103417
PCT Pub. Date: Jun. 30, 2016

(65) Prior Publication Data
US 2017/0350292 A1   Dec. 7, 2017

(51) Int. Cl.
*F01N 3/20* (2006.01)
*F01N 13/00* (2010.01)
(Continued)

(52) U.S. Cl.
CPC ............. *F01N 3/208* (2013.01); *F01N 3/035* (2013.01); *F01N 9/00* (2013.01); *F01N 13/0097* (2014.06); *F02B 37/00* (2013.01)

(58) Field of Classification Search
USPC .......... 60/274, 286, 292, 295, 297, 301, 303
See application file for complete search history.

(56) References Cited

U.S. PATENT DOCUMENTS 6,301,879 B1 * 10/2001 Weisweiler ........ B01D 53/9431
423/237
8,881,507 B2 * 11/2014 Yan ........................ F01N 3/2066
60/286
(Continued)

FOREIGN PATENT DOCUMENTS

CN   101802355 A   8/2010
CN   103237966 A   8/2013
(Continued)

OTHER PUBLICATIONS

International Search Report (dated Mar. 24, 2015) for corresponding International App. PCT/JP2014/084381.
(Continued)

*Primary Examiner* — Binh Q Tran
(74) *Attorney, Agent, or Firm* — Withrow & Terranova, PLLC (57) ABSTRACT

An exhaust purification device for an engine facilitates thawing of a urea aqueous solution, which is frozen in a reducing agent tank of an exhaust purification device, more rapidly. When a urea aqueous solution in a reducing agent tank is frozen at a time of starting an engine, at least a part of the urea aqueous solution to be supplied to an injection nozzle is flown into a reducing agent circulation flow path, a part of which is adjacent to a heat source, and the urea aqueous solution thus heated is returned to the reducing agent tank.

7 Claims, 7 Drawing Sheets

(51) Int. Cl.
    *F01N 3/035*     (2006.01)
    *F01N 9/00*     (2006.01)
    *F02B 37/00*     (2006.01)

(56) References Cited

U.S. PATENT DOCUMENTS

| | | | |
|---|---|---|---|
| 9,732,650 B2* | 8/2017 | Tomita | F01N 3/2066 |
| 2007/0180816 A1* | 8/2007 | Masuda | B01D 53/9409 |
| | | | 60/274 |
| 2010/0242439 A1 | 9/2010 | Domon et al. | |
| 2011/0011064 A1* | 1/2011 | Kamiya | F01P 3/20 |
| | | | 60/295 |
| 2011/0047972 A1 | 3/2011 | Bauer et al. | |
| 2016/0123204 A1* | 5/2016 | Furesawa | F01N 3/208 |
| | | | 60/274 |

FOREIGN PATENT DOCUMENTS

| | | |
|---|---|---|
| CN | 203176653 U | 9/2013 |
| EP | 1656986 A1 | 5/2006 |
| EP | 1662103 A1 | 5/2006 |
| EP | 2743471 A1 | 6/2014 |
| JP | 2008138583 | 6/2008 |
| JP | 2013545037 A | 12/2013 |
| WO | 2010035355 A1 | 9/2010 |
| WO | 2013051315 A1 | 4/2013 |
| WO | 2014016909 A1 | 1/2014 |
| WO | 2014199778 A | 2/2017 |
| WO | 2014199778 A1 | 2/2017 |

OTHER PUBLICATIONS

Chinese Official Action (dated Jan. 21, 2019) for corresponding Chinese App.201480084292.X.
European Official Action (dated Jun. 4, 2018) for corresponding European App. EP14909024.3.
Examination Report for European Patent Application No. 14909024.3, dated Jan. 17, 2019, 4 pages.
Notice of Reasons for Refusal for Japanese Patent Application No. 2016-565772, dated Oct. 2, 2018, 6 pages.

* cited by examiner

EXHAUST PURIFICATION DEVICE FOR ENGINE

BACKGROUND AND SUMMARY

The present invention relates to an exhaust purification device for an engine, which selectively reduces and purifies nitrogen oxide (NOx) in exhaust by a reducing agent.

In an exhaust system for an engine, an exhaust purification device is known, which includes: a selective reduction catalytic converter that selectively reduces and purifies NOx by using ammonia as a reducing agent; and an injection nozzle that injects a urea aqueous solution (a precursor thereof), the injection nozzle being provided upstream the selective reduction catalytic converter in a flow of the exhaust.

Since the urea aqueous solution is frozen at approximately −11° C., there is known such a technology as described in Patent Document 1, in which, after an engine is stopped, a freezing change of the urea aqueous solution, which remains in the injection nozzle and a reducing agent supply flow path, is monitored, and in addition, the injection nozzle is temporarily opened following this freezing change, whereby such a remaining urea aqueous solution is discharged to an exhaust pipe.

Incidentally, particularly in extremely cold regions, not only the urea aqueous solution in the reducing agent supply flow path but also the urea aqueous solution in a reducing agent tank may be completely frozen in some cases. As countermeasures against this matter, an engine coolant pipe path for flowing an engine coolant that is a type of antifreeze has been routed along the reducing agent tank, the reducing agent tank has been warmed by the engine coolant warmed after the engine is started, and the urea aqueous solution has been thawed. However, it has still taken a long time to thaw the urea aqueous solution even if the above-described countermeasures are taken, and a further improvement has been required.

In view of the above, it is desirable to make it possible to further shorten such a thawing time by providing a structure in which at least a part of the reducing agent or the precursor thereof to be supplied to the injection nozzle is heated and returned to the reducing agent tank.

An exhaust purification device for an engine according to an aspect of the present invention includes: a selective reduction catalytic converter that selectively reduces and purifies nitrogen oxide in exhaust by using a reducing agent, the selective reduction catalytic converter being provided in an exhaust path of the engine; an injection device that injects and supplies a liquid reducing agent or a precursor thereof to an upstream portion of the selective reduction catalytic converter in an exhaust direction; a tank that stores the liquid reducing agent or the precursor thereof, the liquid reducing agent or the precursor thereof being to be injected and supplied from the injection device; a reducing agent supply flow path that supplies the liquid reducing agent or the precursor thereof from the tank to the injection nozzle; a reducing agent circulation flow path that is branched from midway of the reducing agent supply flow path, is capable of returning a part of the liquid reducing agent or the precursor thereof to the tank, and has a part disposed to be capable of exchanging heat with a heat source; a reducing agent circulation valve that controls a flow of the liquid reducing agent or the precursor thereof to the reducing agent circulation flow path; a temperature detection unit that detects a temperature of the liquid reducing agent or the precursor thereof in the tank or the reducing agent supply flow path; and a reducing agent circulation control unit that controls the reducing agent circulation valve so that the liquid reducing agent or the precursor thereof can flow into the reducing agent circulation flow path when the temperature of the liquid reducing agent or the precursor thereof is equal to or less than a predetermined temperature, the temperature being detected by the temperature detection unit.

According to an aspect of the present invention, there is provided the structure in which the at least a part of the reducing agent or the precursor thereof to be supplied to the injection nozzle is heated and returned to the reducing agent tank, and accordingly, it is made possible to further shorten the thawing time.

DETAILED DESCRIPTION

Hereinafter, embodiments of the present invention will be described in detail.

Figure 1:
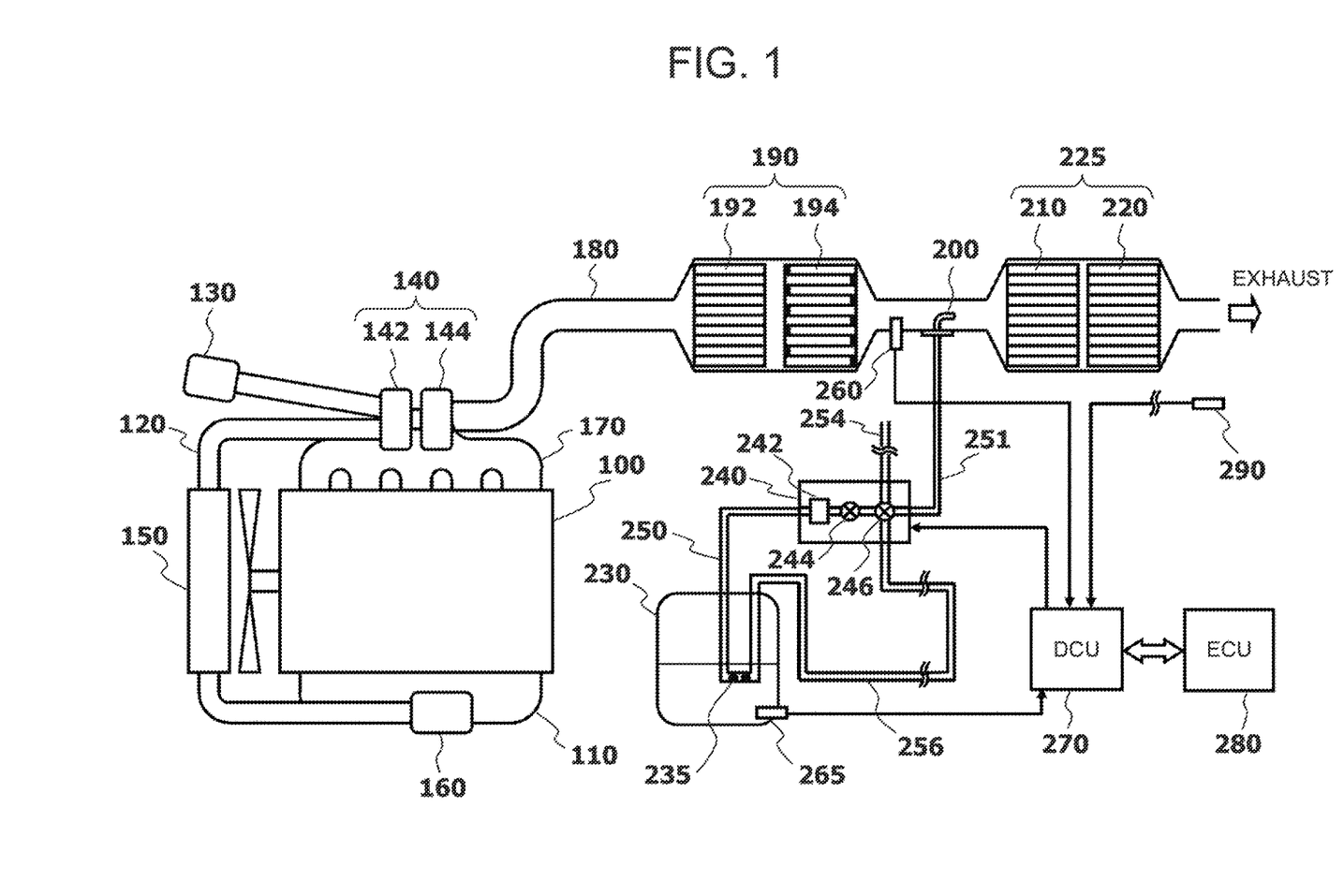
FIG. 1 is an entire configuration diagram illustrating an example of an exhaust purification device.

FIG. 1 illustrates an example of an exhaust purification device that purifies particulate matter (PM) and NOx in exhaust.

In an intake pipe 120 connected to an intake manifold 110 of a diesel engine 100, along an intake air flowing direction, there are disposed, in a following order: an air cleaner 130 that filters dust and the like in intake air; a compressor 142 of a turbocharger 140 that supercharges the intake air; an intercooler 150 that cools the intake air that has passed through the compressor 142; and an intake collector 160 that smoothes pulsation of the intake air.

Meanwhile, in an exhaust pipe 180 connected to an exhaust manifold 170 of the diesel engine 100, along an exhaust flowing direction, there are disposed, in a following order: a turbine 144 of the turbocharger 140; a continuous regeneration-type diesel particulate filter (hereinafter referred to as "DPF") device 190; an injection nozzle 200 that injects and supplies a urea aqueous solution as a reducing agent precursor, and a urea selective reduction catalytic converter system 225.

The continuous regeneration-type DPF device 190 includes: a DOC (Diesel Oxidation Catalyst) converter 192 that oxidizes at least NO (nitrogen monoxide) to $NO_2$ (nitrogen dioxide); and a DPF 194 that collects and removes PM. Note that, as the DPF 194, a CSF (Catalyzed Soot Filter), on a surface of which a catalyst (an active component and an additional component) is carried, can also be used in place of a general DPF.

The urea selective reduction catalytic converter system 225 includes: a selective reduction catalytic converter 210 that selectively reduces and purifies NOx by using ammonia, which is generated from a urea aqueous solution, as a reducing agent; and an oxidation catalytic converter 220 that oxidizes the ammonia that has passed through the selective reduction catalytic converter 210.

The urea aqueous solution stored in a reducing agent tank 230 is sucked by a reducing agent dosing unit 240, which is installed midway in reducing agent supply flow paths 250 and 251, passes through the reducing agent supply flow paths 250 and 251, and is supplied to the injection nozzle 200. In the reducing agent dosing unit 240 located midway in the reducing agent supply flow paths 250 and 251, the reducing agent supply flow paths 250 and 251 branch to a reducing agent circulation flow path 256 for returning the urea aqueous solution to the reducing agent tank 230, and branch to an outside air introduction flow path 254 for introducing outside air (air) to the reducing agent circulation flow path 256. A terminal end of the reducing agent circulation flow path 256 is connected in a loop to a suction end of the reducing agent supply flow path 250 in the reducing agent tank 230. Although details of the reducing agent circulation flow path 256 will be described later, a part thereof is disposed near a heat source.

Moreover, at a connecting portion between the reducing agent supply flow path 250 and the reducing agent circulation flow path 256 in the reducing agent tank 230, there are provided one or more communication holes 235 through which the urea aqueous solution can flow back and forth between the reducing agent tank 230 and these flow paths (the urea aqueous solution can be sucked from the reducing agent tank 230 to the reducing agent supply flow path 250, or the urea aqueous solution can be returned from the reducing agent circulation flow path 256 to the reducing agent tank 230). Hence, the urea aqueous solution passes through the communication holes 235 provided in the flow paths, is sucked up into the reducing agent supply flow path 250, and is supplied to the injection nozzle 200.

Furthermore, an electric heater (not illustrated) is disposed around the reducing agent supply flow paths 250 and 251. In this way, even if the urea aqueous solution remaining in the reducing agent supply flow paths 250 and 251 is frozen after the engine is stopped, the urea aqueous solution thus frozen is heated and thawed by the electric heater around the reducing agent supply flow paths 250 and 251 at a time of starting the engine.

Although an internal configuration of the reducing agent dosing unit 240 will be described later, the reducing agent dosing unit 240 not only supplies the urea aqueous solution from the reducing agent tank 230 to the injection nozzle 200, but also controls the flow (a flow rate, a route) of the urea aqueous solution and the introduction of the outside air into the reducing agent circulation flow path 256.

In order to grasp an active state of the selective reduction catalytic converter 210, an exhaust temperature sensor 260 that measures a temperature of the exhaust (that is, an exhaust temperature) is attached to the exhaust pipe 180 located between the continuous regeneration-type DPF device 190 and the injection nozzle 200. Moreover, a urea aqueous solution temperature sensor 265 that measures a temperature of the urea aqueous solution (that is, a urea aqueous solution temperature) is attached to the reducing agent tank 230. Respective output signals of the exhaust temperature sensor 260, the urea aqueous solution temperature sensor 265 and an outside air temperature sensor 290 are input to a reducing agent dosing control unit (DCU) 270 having a computer built therein. Furthermore, in order to make it possible to read a rotational speed and a load, which are examples of an engine operating state, at an arbitrary point of time, the DCU 270 is communicably connected via an in-vehicle network such as a CAN (Controller Area Network) to an engine control unit (ECU) 280 that electronically controls the diesel engine 100.

Then, the DCU 270 executes a control program stored in a nonvolatile memory such as a flash ROM (Read Only Memory), thereby electronically controlling the reducing agent dosing unit 240 based on the exhaust temperature, the rotational speed and the load. Moreover, the DCU 270 executes thawing processing for the urea aqueous solution, which will be described later, based on an outside air temperature and a urea aqueous solution temperature.

Here, as the load of the diesel engine 100, a quantity of state can be used, which is closely related to engine torque, and includes, for example, a fuel injection quantity, an intake air flow rate, an intake air pressure, a supercharge pressure, an accelerator opening and the like. Moreover, the rotational speed and load of the diesel engine 100 may be directly detected by using a sensor, which is known in public, instead of reading the rotational speed and the load from the ECU 280.

In such an exhaust purification device as described above, the exhaust of the diesel engine 100 is introduced into the DOC converter 192 of the continuous regeneration-type DPF device 190 via the exhaust manifold 170 and the turbine 144 of the turbocharger 140. The exhaust introduced into the DOC converter 192 flows to the DPF 194 while NO is being oxidized to $NO_2$. In the DPF 194, PM in the exhaust is collected, and in addition, PM is continuously oxidized (burned) by using $NO_2$ generated by the DOC converter 192.

Furthermore, the urea aqueous solution injected and supplied (added) from the injection nozzle 200 in response to the engine operating state is hydrolyzed by using exhaust heat and water vapor in the exhaust, and is converted into ammonia that functions as the reducing agent. This ammonia undergoes a selective reduction reaction with NOx in the exhaust in the selective reduction catalytic converter 210, and is purified to $H_2O$ (water) and $N_2$ (nitrogen), which is harmless. At this time, NO is oxidized to $NO_2$ by the DOC converter 192, a ratio of NO and $NO_2$ in the exhaust is improved to be suitable for the selective reduction reaction, and accordingly, a NOx purification rate in the selective reduction catalytic converter 210 can be enhanced. Meanwhile, the ammonia that has passed through the selective reduction catalytic converter 210 is oxidized by the oxidation catalytic converter 220 disposed downstream thereof in the flow of the exhaust, and accordingly, the ammonia can be suppressed from being directly released into the atmosphere.

Figure 2:
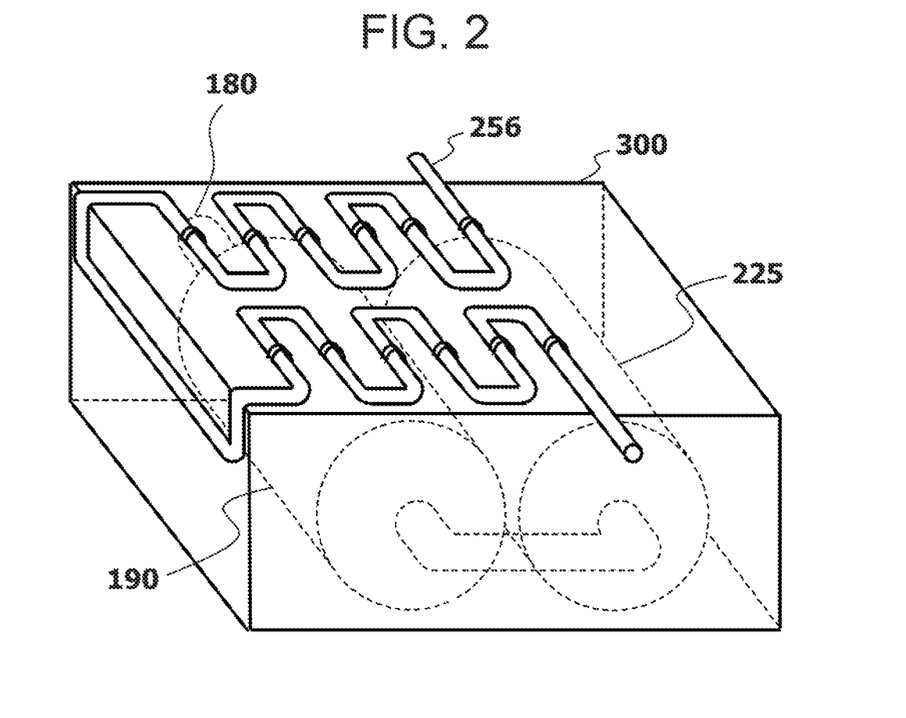
FIG. 2 is a perspective view illustrating a first embodiment of a layout of a reducing agent circulation flow path.
Figure 3:
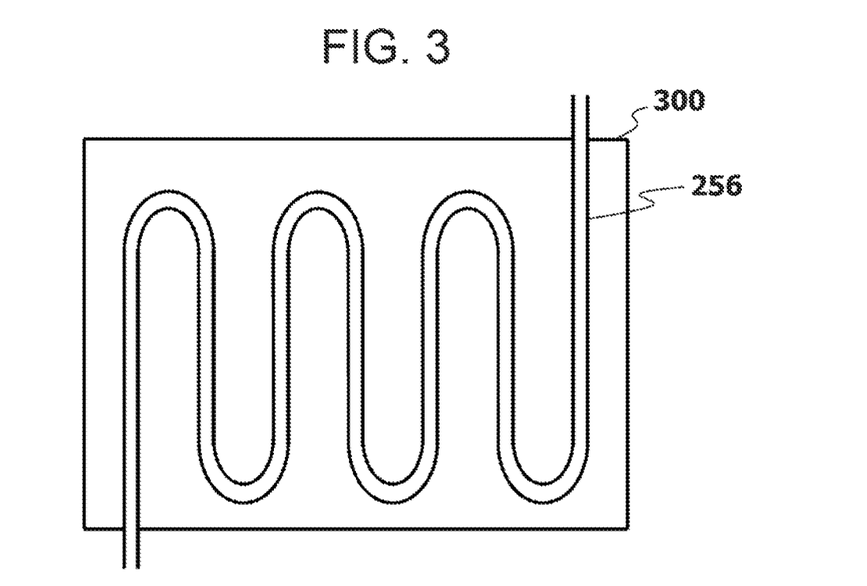
FIG. 3 is a top view illustrating a second embodiment of the layout of the reducing agent circulation flow path.
Figure 4:
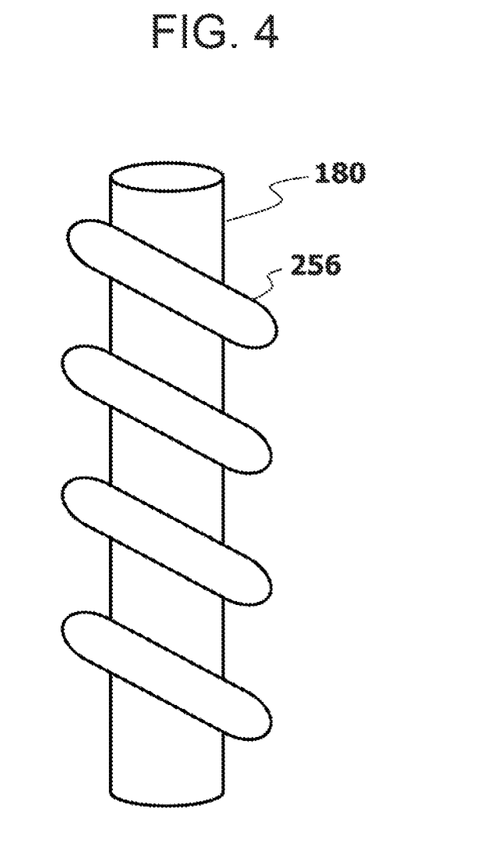
FIG. 4 is a side view illustrating a third embodiment of the layout of the reducing agent circulation flow path.

FIG. 2, FIG. 3 and FIG. 4 illustrate examples of a layout of the reducing agent circulation flow path 256. With regard to the reducing agent circulation flow path 256, a part of the flow path concerned is disposed near the heat source so that the urea aqueous solution that flows through the flow path can be heated.

A part of the reducing agent circulation flow path 256 in FIG. 2 is disposed so as to crawl on a heat exchange plate that composes an upper surface and side surfaces of a cabinet 300. Here, the cabinet 300 houses the continuous regeneration-type DPF device 190, the urea selective reduction catalytic converter system 225 and the exhaust pipe 180 that connects the continuous regeneration-type DPF device 190 and the urea selective reduction catalytic converter system 225 to each other. In this way, the urea aqueous solution that flows through the reducing agent circulation flow path 256 exchanges heat with the heat exchange plate heated by such exhaust heat of the exhaust pipe 180, and is heated and returned to the reducing agent tank 230. Note that the reducing agent circulation flow path 256 just needs to be disposed so as to be capable of heat exchange with the heat source, and for example, may be disposed so as to crawl on the heat exchange plate that composes a lower surface and side surfaces of the cabinet 300.

FIG. 3 illustrates a layout of another reducing agent circulation flow path 256 when viewed from above the cabinet 300 of FIG. 2. Note that the reducing agent circulation flow path 256 in FIG. 3 may also be disposed so as to crawl on the heat exchange plate that composes the lower surface and side surfaces of the cabinet 300.

Moreover, as illustrated in FIG. 4, the reducing agent circulation flow path 256 may be disposed in a spiral shape around the exhaust pipe 180.

The reducing agent dosing unit 240 includes: a pump 242 that sucks the urea aqueous solution into the reducing agent supply flow path 250; a flow rate control valve 244 for controlling the flow rate of the urea aqueous solution; and a flow path switching valve 246 for switching a route of the urea aqueous solution.

As the flow rate control valve 244, an existing one such as a butterfly valve and a globe valve can be used, and the flow rate control valve 244 is controlled by the DCU 270 by an existing method such as an actuator.

The flow path switching valve 246 will be described with reference to FIG. 5 (and FIG. 6 and FIG. 7). The flow path switching valve 246 is composed of a first rotary valve 247 and a second rotary valve 248 disposed in an inside of the first rotary valve 247. The first rotary valve 247 and the second rotary valve 248 are rotationally controlled by the DCU 270 by an existing method such as an actuator.

In the first rotary valve 247, a "T"-shaped flow path is formed in a rotor thereof, and the first rotary valve 247 has two rotational positions (first and second rotational positions) of 0° and 900 in a clockwise direction.

At the first rotational position (FIG. 5 and FIG. 6), the outside air introduction flow path 254 is closed, thereby enabling three parties to communicate with one another, in which the three parties are the upstream-side reducing agent supply flow path 250, the downstream-side reducing agent supply flow path 251, and the reducing agent circulation flow path 256.

Moreover, at the second rotational position (FIG. 7), downstream-side reducing agent supply flow path 251 is closed, thereby enabling three parties to communicate with one another, in which the three parties are the outside air introduction flow path 254, the reducing agent circulation flow path 256, and the upstream-side reducing agent supply path 250.

In the second rotary valve 248, a linear flow path is formed at an eccentric position of the rotor disposed at a center of the rotor of the first rotary valve 247, and the second rotary valve 248 has three rotational positions (rotational positions A, B and C) of 0°, 45° and 90° in the clockwise direction.

The rotational position A (FIG. 5) of the second rotary valve 248 is used in combination with the first rotational position of the first rotary valve 247, closes the reducing agent circulation flow path 256, and allows only the upstream-side reducing agent supply flow path 250 and the downstream-side reducing agent supply flow path 251 to communicate with each other (reducing agent addition mode).

The rotational position B (FIG. 6) of the second rotary valve 248 is used in combination with the first rotational position of the first rotary valve 247, closes the downstream-side reducing agent supply flow path 251, and allows only the upstream-side reducing agent supply flow path 250 and the reducing agent circulation flow path 256 to communicate with each other (reducing agent circulation mode).

The rotational position C (FIG. 7) of the second rotary valve 248 is used in combination with the second rotational position of the first rotary valve 247, closes the upstream-side reducing agent supply path 250, and allows only the outside air introduction path 254 and the reducing agent circulation path 256 to communicate with each other (purge mode).

As described above, the flow path switching valve 246 can switch the flow path according to the respective rotational positions of the first rotary valve 247 and the second rotary valve 248, and has three modes, which are the reducing agent addition mode, the reducing agent circulation mode and the purge mode.

Figure 8:
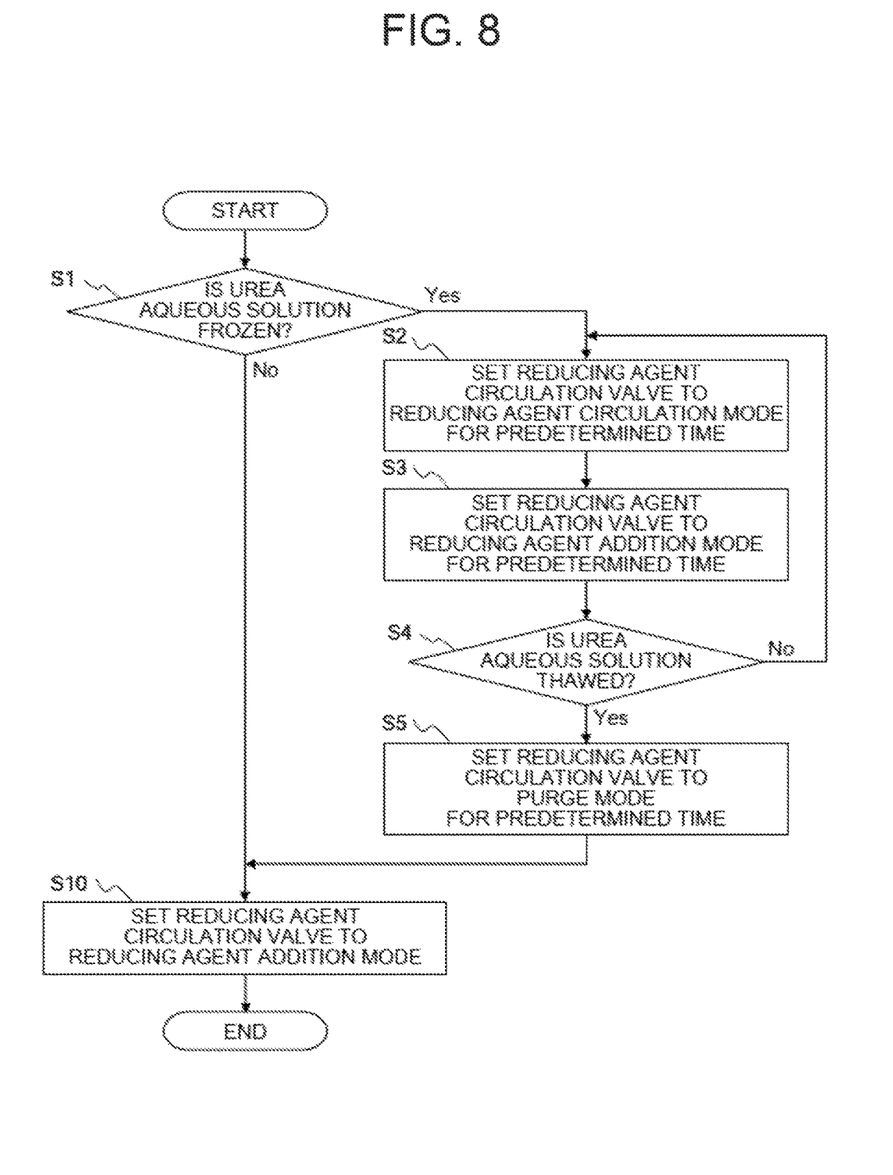
FIG. 8 is a configuration diagram illustrating an example of a control program for thawing processing of a urea aqueous solution.

FIG. 8 illustrates an example of a control program repeatedly executed by the ECU 280 every predetermined time upon when the engine is started. By this control program, functions of a reducing agent circulation control unit and an outside air introduction control unit are realized.

In Step 1 (abbreviated as "S1" in FIG. 8; the same applies below), the ECU 280 determines whether or not the urea aqueous solution stored in the reducing agent tank 230 is frozen. Specifically, the ECU 280 reads the urea aqueous solution temperature from the urea aqueous solution temperature sensor 265, and determines whether or not the urea aqueous solution temperature is equal to or lower than a freezing temperature of the urea aqueous solution (whether or not the urea aqueous solution is frozen). In an example, this freezing temperature is set to approximately −11° C. at which the urea aqueous solution is frozen.

Note that a temperature sensor for measuring the temperature of the urea aqueous solution may be provided in the reducing agent supply flow paths 250 and 251, the urea aqueous solution temperature may be read from this temperature sensor, and it may be determined whether or not the urea aqueous solution is frozen.

Then, if the ECU 280 determines that the urea aqueous solution is frozen (Yes), then the ECU 280 advances the processing to Step 2, and meanwhile, if the ECU 280 determines that the urea aqueous solution is not frozen (No), then the ECU 280 advances the processing to Step 10.

In Step 2, the ECU 280 sets the flow path switching valve 246 to a reducing agent circulation mode (refer to FIG. 6) for a predetermined time. Specifically, the DCU 270 outputs a control signal to the actuator that controls the flow path switching valve 246, thereby setting the flow path switching valve 246 to the reducing agent circulation mode, and allowing the reducing agent supply flow path 250 and the reducing agent circulation flow path 256 to communicate with each other. In this way, the urea aqueous solution sucked from the reducing agent tank 230 into the reducing agent supply flow path 250 is guided to the reducing agent circulation flow path 256. Then, the urea aqueous solution guided to the reducing agent circulation flow path 256 exchanges heat with the heat source such as the heat exchange plate adjacent to the reducing agent circulation flow path 256, and the urea aqueous solution is heated. The urea aqueous solution thus heated is returned to the reducing agent tank 230, and exchanges heat with the urea aqueous solution in the reducing agent tank 230, thereby thawing the urea aqueous solution in the reducing agent tank 230. After the reducing agent circulation mode is executed for a predetermined time in Step 2, the processing proceeds to Step 3.

In Step 3, the ECU 280 sets the flow path switching valve 246 to a reducing agent addition mode for a predetermined time. Specifically, the DCU 270 outputs a control signal to the actuator that controls the flow path switching valve 246, thereby setting the flow path switching valve 246 to the reducing agent addition mode. In this way, the urea aqueous solution sucked from the reducing agent tank 230 into the reducing agent supply flow path 250 is supplied to the injection nozzle 200. After the reducing agent addition mode is executed for a predetermined time in Step 3, the processing proceeds to Step 4.

In Step 4, the ECU 280 determines whether or not the urea aqueous solution stored in the reducing agent tank 230 is thawed. Specifically, the ECU 280 reads the urea aqueous solution temperature from the urea aqueous solution temperature sensor 265, and determines whether or not the urea aqueous solution temperature has exceeded the freezing temperature of the urea aqueous solution (whether or not the urea aqueous solution is thawed).

Then, if the ECU 280 determines that the urea aqueous solution is thawed (Yes), then the ECU 280 advances the processing to Step 5, and meanwhile, if the ECU 280 determines that the urea aqueous solution is not thawed (No), then the ECU 280 returns the processing to Step 2.

A urea aqueous solution thawing method in this embodiment is to thaw the urea aqueous solution while switching between the reducing agent circulation mode and the reducing agent addition mode. Hence, when the urea aqueous solution is frozen at the time of starting the engine, NOx in the exhaust is purified simultaneously when the urea aqueous solution is thawed.

Here, the predetermined time for executing the reducing agent circulation mode in Step 2 and the reducing agent addition mode in Step 3 will be described. In this embodiment, when the urea aqueous solution is completely frozen, the urea aqueous solution is thawed by sustaining the reducing agent circulation mode for a long time, and as the urea aqueous solution is thawed, the time of the reducing agent circulation mode is decreased, and meanwhile, the time of the reducing agent addition mode is increased. A thawed state of the urea aqueous solution may be determined based on the urea aqueous solution temperature sensor 265, or may be estimated and determined based on an application time of the reducing agent circulation mode.

Figure 7:
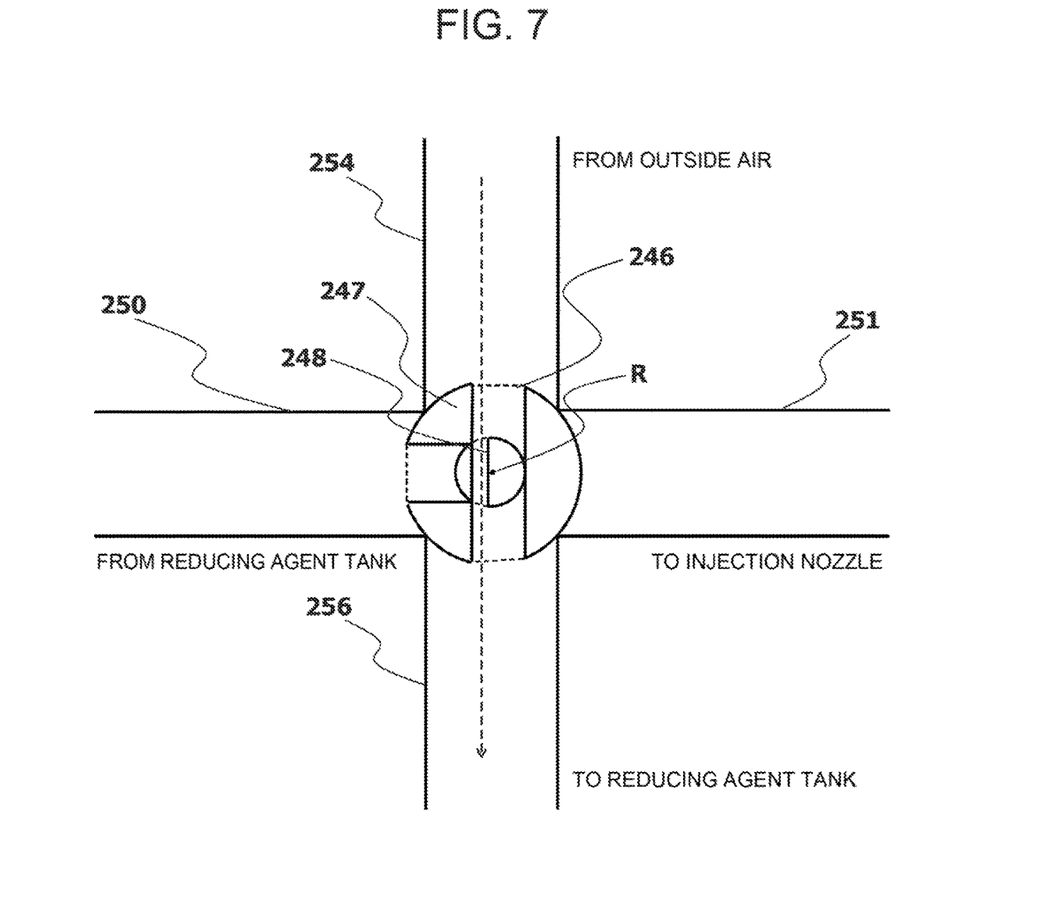
FIG. 7 is a view illustrating an example of the flow path switching valve in a purge mode.

In Step 5, the ECU 280 sets the flow path switching valve 246 to the purge mode (refer to FIG. 7). Specifically, the DCU 270 outputs a control signal to the actuator that controls the flow path switching valve 246, thereby setting the flow path switching valve 246 to the purge mode, and allowing the outside air supply flow path 254 and the reducing agent circulation flow path 256 to communicate with each other. In this way, the outside air supplied from the outside air supply flow path 254 is guided to the reducing agent circulation flow path 256, and the urea aqueous solution remaining in the reducing agent circulation flow path 256 is pushed out to the reducing agent tank 230. The outside air is introduced into the reducing agent circulation flow path 256 for a predetermined time, whereby the reducing agent circulation flow path 256 becomes empty. Thereafter, even if the flow path switching valve 246 is returned to the reducing agent addition mode, the reducing agent circulation flow path 256 remains empty. After the purge mode is executed for a predetermined time in Step 5, the processing proceeds to Step 10.

Figure 5:
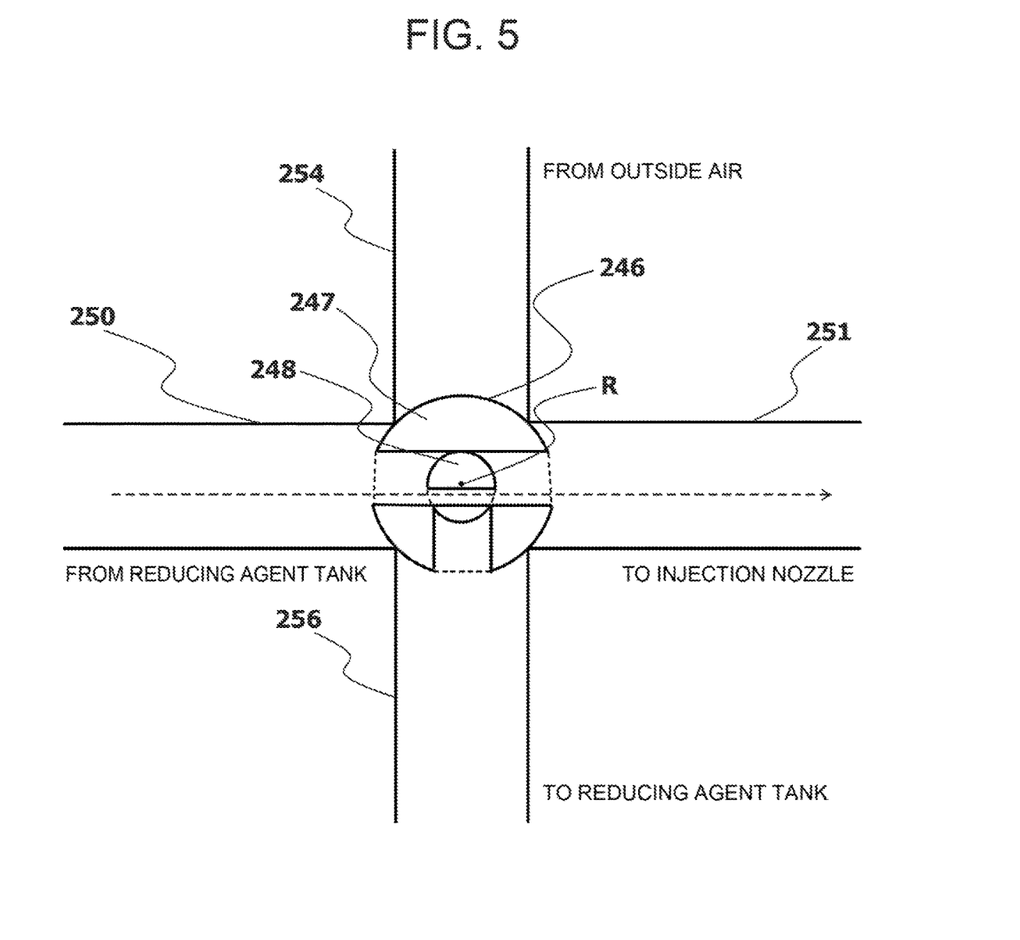
FIG. 5 is a view illustrating an example of a flow path switching valve in a reducing agent addition mode.
Figure 6:
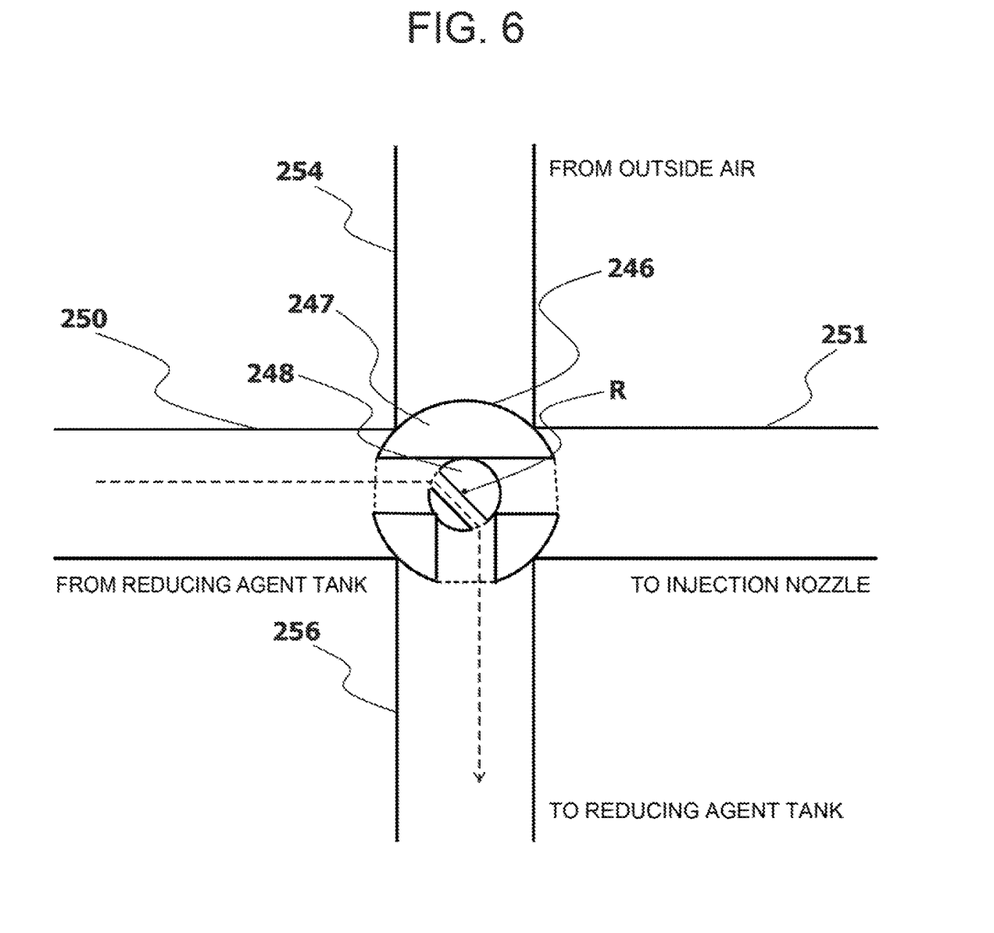
FIG. 6 is a view illustrating an example of the flow path switching valve in a reducing agent circulation mode.

In Step 10, the ECU 280 sets the flow path switching valve 246 to the reducing agent addition mode (refer to FIG. 5). Thereafter, the ECU 280 injects and supplies (adds) the urea aqueous solution from the injection nozzle 200 in response to the engine operating state, and purifies the NOx in the exhaust.

According to this embodiment, when the urea aqueous solution in the reducing agent tank 230 is frozen at the time of starting the engine, the urea aqueous solution is flown into the reducing agent circulation flow path 256, a part of which is adjacent to the heat source, and the urea aqueous solution thus heated is returned to the reducing agent tank 230. In this way, the urea aqueous solution of the reducing agent tank 230 can be thawed more rapidly.

Moreover, according to this embodiment, the reducing agent supply flow path 250 is connected to the reducing agent circulation flow path 256 in the reducing agent tank 230, and the communication holes 235 with the inside of the tank described above is provided in this connection portion. The urea aqueous solution heated in the reducing agent circulation flow path 256 and the urea aqueous solution in the reducing agent tank 230 are mixed with each other in the reducing agent tank 230 by the communication holes 235, and the heat exchange can be efficiently carried out in a wide range of the reducing agent tank 230.

Furthermore, according to this embodiment, the reducing agent supply flow path 250 and the reducing agent circulation flow path 256 are connected to each other in a loop. In this way, a substantially closed circuit with a small capacity is formed, and is then heated, and accordingly, the thawing time can be shortened to a large extent.

Moreover, according to this embodiment, the electric heater is provided in the reducing agent supply flow paths 250 and 251. In this way, even when the urea aqueous solution is frozen in the reducing agent supply flow paths 250 and 251, the urea aqueous solution in the reducing agent supply flow paths 250 and 251 is thawed by the electric heater, and by circulating the urea aqueous solution thus thawed, the urea aqueous solution in the reducing agent tank 230 can be thawed. Hence, it becomes unnecessary to dispose the engine coolant pipe, which serves for flowing engine coolant as a type of antifreeze, around the reducing agent tank 230 and the reducing agent supply flow paths 250 and 251, in order to thaw the frozen urea aqueous solution, and a piping structure for the engine coolant can be simplified.

Furthermore, according to this embodiment, after the introduction of the urea aqueous solution into the reducing agent circulation flow path 256 is stopped, the outside air is introduced into the reducing agent circulation flow path 256, and the reducing agent circulation flow path 256 is made empty. In this way, the urea aqueous solution can be suppressed from being thawed in the reducing agent circulation flow path 256.

In the flow path switching valve 246 in this embodiment, the function to introduce the urea aqueous solution into the reducing agent circulation flow path 256 and the function to introduce the outside air into the reducing agent circulation flow path 256 are integrated with each other; however, the functions can also be realized by using a plurality of valves, for example, a reducing agent circulation valve for controlling the urea aqueous solution to the reducing agent circulation flow path and an outside air introduction valve for controlling inflow of the outside air to the reducing agent circulation flow path.

Moreover, such a liquid reducing agent or a precursor thereof is not limited to the urea aqueous solution, and as the liquid reducing agent or the precursor thereof, an ammonia aqueous solution, diesel oil that contains hydrocarbon as a main component and the like can also be used in response to a function of an exhaust purification element that purifies harmful substances of the exhaust, and the like. In this case, the freezing temperature for determining whether or not the liquid reducing agent or the precursor thereof is frozen just needs to be appropriately selected in response to characteristics thereof.

REFERENCE SYMBOL LIST

100 Diesel engine
110 Intake manifold
120 Intake pipe
130 Air cleaner
140 Turbocharger
142 Compressor
144 Turbine
150 Intercooler
160 Intake collector
170 Exhaust manifold
180 Exhaust pipe
190 Continuous regeneration-type DPF device
192 DOC converter
194 DPF
200 Injection nozzle
210 Selective reduction catalytic converter
220 Oxidation catalytic converter
225 Urea selective reduction catalytic converter system
230 Reducing agent tank
235 Communication hole
240 Reducing agent dosing unit
242 Pump
244 Flow rate control valve
246 Flow path switching valve
247 First rotary valve
248 Second rotary valve
250, 251 Reducing agent supply flow path
254 Outside air introduction flow path
256 Reducing agent circulation flow path
260 Exhaust temperature sensor
265 Urea aqueous solution temperature sensor
270 DCU
280 ECU
290 Outside air temperature sensor
300 Cabinet

The invention claimed is:
1. An exhaust purification device for an engine, the exhaust purification device comprising:
a selective reduction catalytic converter that is provided in an exhaust path of the engine, and selectively reduces and purifies nitrogen oxide in exhaust by using a reducing agent;
an injection device that injects and supplies a liquid reducing agent or a precursor thereof to an upstream portion of the selective reduction catalytic converter;
a tank that stores the liquid reducing agent or the precursor thereof, the liquid reducing agent or the precursor thereof being to be injected and supplied from the injection device;
a reducing agent supply flow path that supplies the liquid reducing agent or the precursor thereof from the tank to the injection device;
a reducing agent circulation flow path that is branched from the reducing agent supply flow path, is capable of returning a part of the liquid reducing agent or the precursor thereof to the tank, and has a part disposed to exchange heat with a heat source, the heat source comprising one or more components in the exhaust path;
a reducing agent circulation valve that controls a flow of the liquid reducing agent or the precursor thereof to the reducing agent circulation flow path;
a temperature detection unit that detects a temperature of the liquid reducing agent or the precursor thereof in the tank or the reducing agent supply flow path; and
a reducing agent circulation control unit that controls the reducing agent circulation valve so that the liquid reducing agent or the precursor thereof can flow into the reducing agent circulation flow path when the temperature of the liquid reducing agent or the precursor thereof is equal to or less than a predetermined temperature, the temperature being detected by the temperature detection unit.

2. The exhaust purification device for an engine according to claim 1, wherein the reducing agent circulation flow path is connected to the reducing agent supply flow path in the tank, and a communication portion with an inside of the tank is provided in a connection portion.

3. The exhaust purification device for an engine according to claim 1, wherein exhaust emitted from the engine is used as the heat source.

4. The exhaust purification device for an engine according to claim 1, further comprising:
an outside air introduction flow path that introduces outside air to the reducing agent circulation flow path to purge the liquid reducing agent or the precursor thereof in the reducing agent circulation flow path to the tank;
an outside air introduction valve that performs a control to introduce the outside air; and
an outside air introduction control unit that controls the outside air introduction valve to introduce the outside air to the reducing agent circulation flow path after the liquid reducing agent or the precursor thereof has stopped flowing into the reducing agent circulation flow path.

5. The exhaust purification device for an engine according to claim 4, wherein the outside air introduction flow path is connected to a branch portion of the reducing agent circulation flow path from the reducing agent supply flow path, and the outside air introduction valve and the reducing agent circulation valve are integrated with each other at the branch portion.

6. The exhaust purification device for an engine according to claim 1, comprising an electric heater disposed around the reducing agent supply flow path.

7. The exhaust purification device for an engine according to claim 1, wherein the one or more components in the exhaust path comprises an exhaust pipe or a cabinet housing one or more of a diesel particulate filter, the selective reduction catalytic converter, and the exhaust pipe.

* * * * *